United States Patent [19]

Woods

[11] Patent Number: 4,611,171

[45] Date of Patent: Sep. 9, 1986

[54] LOCATION INDICATOR FOR A MARINE SEISMIC CABLE COMPRISING OPERATOR CONTROLLED SATURABLE CORE MAGNETOMETERS

[75] Inventor: Theodore E. Woods, Houston, Tex.

[73] Assignee: Syntron, Inc., Houston, Tex.

[21] Appl. No.: 501,809

[22] Filed: Jun. 7, 1983

[51] Int. Cl.⁴ .................. G01R 33/04; G01V 1/38; G01C 17/28

[52] U.S. Cl. .................................... 324/253; 367/19; 33/361

[58] Field of Search .................. 367/19; 324/253–255, 324/247; 33/361

[56] References Cited

U.S. PATENT DOCUMENTS

| | | | |
|---|---|---|---|
| 3,772,503 | 11/1973 | Fowler | 235/150.5 |
| 3,832,787 | 9/1974 | Fowler | 33/358 |
| 3,833,901 | 9/1974 | Fowler | 340/347 P |
| 3,888,016 | 6/1975 | Fowler | 33/346 |
| 3,927,474 | 12/1975 | Lapeyre et al. | 33/356 |
| 3,953,827 | 4/1976 | Le Moal et al. | 367/19 |
| 4,027,398 | 6/1977 | Fowler et al. | 33/363 K |
| 4,032,222 | 6/1977 | Lapeyre | 350/276 R |
| 4,047,168 | 6/1977 | Fowler | 340/310 R |
| 4,068,208 | 10/1978 | Rice, Jr. et al. | 367/19 |
| 4,109,389 | 8/1978 | Balcom et al. | 33/363 K |
| 4,117,602 | 10/1978 | Lapeyre | 33/352 |
| 4,231,111 | 10/1980 | Neeley | 367/19 |
| 4,277,751 | 7/1981 | Lawson et al. | 324/247 |
| 4,290,124 | 9/1981 | Cole | 367/18 |
| 4,323,990 | 4/1982 | Goode et al. | 367/21 |
| 4,404,523 | 9/1983 | Hughes et al. | 324/207 |
| 4,481,611 | 11/1984 | Burrage | 367/19 |

Primary Examiner—Ernest F. Karlsen
Assistant Examiner—Walter E. Snow
Attorney, Agent, or Firm—Arnold, White & Durkee

[57] ABSTRACT

Sensors mounted in detachable modules are located at selected positions along a cable, such as one used in marine seismic exploration, adapted to be towed behind a vessel in a body of water. The sensors are selectively addressable, either individually or as a group, by coded signals sent through the cable. When addressed, the sensors provide readings of the earth's magnetic field vector. The readings are used to provide an indication of the position of the sensors and thus the cable relative to the towing vessel. Cable depth readings may also be made by the sensors.

6 Claims, 8 Drawing Figures

LOCATION INDICATOR FOR A MARINE SEISMIC CABLE COMPRISING OPERATOR CONTROLLED SATURABLE CORE MAGNETOMETERS

BACKGROUND OF INVENTION

1. Field of Invention

The present invention relates to monitoring the position of a cable being towed in a body of water.

2. Description of Prior Art

In marine seismic exploration, a seismic cable often as long as two miles is towed behind a vessel. Hydrophones in the cable sense the response to submerged earthen formations to seismic energy. It is desirable to know as accurately as possible the relative position of the cable along its length with respect to the vessel. U.S. Pats. Nos. 4,231,111; 3,953,827; 4,068,208 and 4,323,990 relate to systems using magnetic compass readings for providing information as to the relative location of a seismic cable behind a vessel. However, so far as is known, these magnetic compasses were mounted within the seismic cables. With such systems repair or replacement of the compasses required disassembly of the cable, which was undesirable, particularly during survey operations. It was also difficult to mount the compasses in a proper position of alignment within the cable.

U.S. Pat. No. 4,267,585 relates to a collar through which a cable was towed. Instrumentation in the collar sensed the relative position of the cable as it passed through the collar to gain an indication of the configuration or profile of the cable in the water.

Another type of electromagnetic compass used in cables was based on an optically coded compass disk connected to a magnet. As the magnet moved due to changes in the earth's magnetic field, the disk moved correspondingly. The surface of the coded disk was scanned photoelectrically to provide output signals indicative of the magnet position and thus the earth's magnetic field. Such a compass is shown, for example in U.S. Pats. Nos. 4,117,602; 4,109,389; 4,032,222; 4,027,398; 3,888,016; 3,772,503; 3,833,901; 3,832,787; 3,927,474 and 4,047,168.

SUMMARY OF INVENTION

Briefly, the present invention provides a new and improved cable location apparatus for indicating the location of a cable, such as a marine seismic cable, being towed behind a vessel. A flux-gate magnetometer senses a magnetic vector indicative of the earth's magnetic field in the vicinity of the cable. Preferably, the magnetometer includes a saturable ferromagnetic core which is periodically driven into saturation to opposite polarities by an excitation winding. First and second sensor coils are located in quadrature relation to each other on the core and form signals indicative of sensed first and second horizontal components of the earth's magnetic vector.

The signals indicative of the sensed components of the earth's magnetic vector are then converted into an appropriate format and transmitted to the vessel as digital signals. The sensing, conversion and transmitting functions of the apparatus of the present invention are performed under control of a processor, preferably a microprocessor, operating in response to a stored series of instructions contained in a memory.

The apparatus can also sense cable depth and transmit signals indicative of this depth to the vessel. The apparatus senses the depth of the cable at the same location as the heading sensor, therefore defining the cable location both in the horizontal and vertical planes. This makes it possible to estimate the exact position, both horizontally and vertically, of the cable using suitable curve fitting computations.

The apparatus of the present invention is attached externally to the cable at selected locations along the length of the cable, and can be easily removed or relocated without requiring disassembly or disconnection of sections of the cable. The apparatus of the present invention further operates with minimum power consumption. Primary operating electrical power is provided to electronic circuits in the apparatus only in response to receipt of a coded command signal, indicating a data reading is requested from the apparatus. Otherwise, minimal power is consumed. The flux-gate magnetometer in the apparatus of the present invention is compact and of sturdy construction, yet provides sensitive and accurate readings.

DESCRIPTION OF PREFERRED EMBODIMENT

Figure 2:
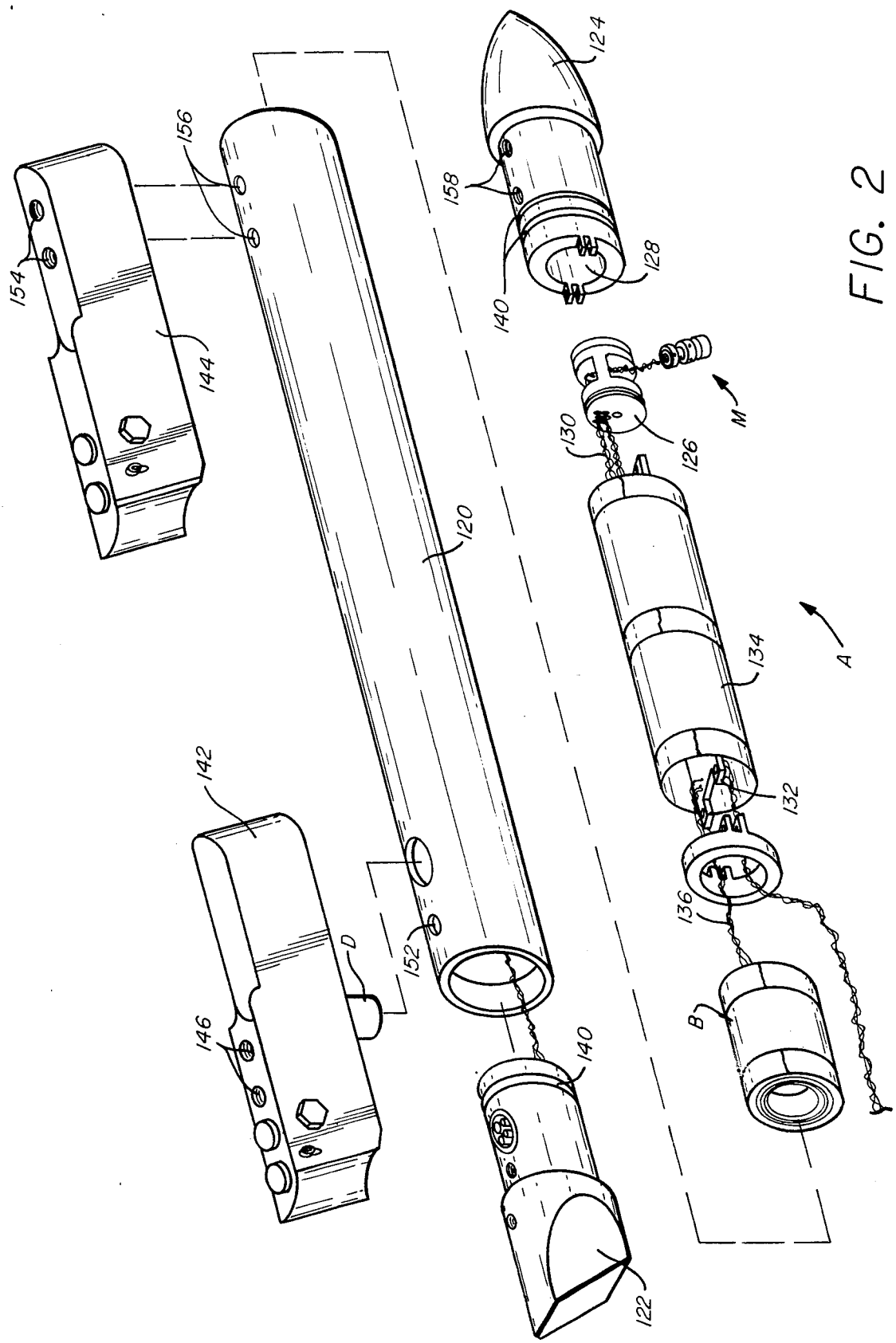
FIG. 2 is an exploded isometric view of an apparatus of the present invention.

In the drawings, the letter A (FIG. 2) designates generally an apparatus for indicating the location of a cable, such as a marine seismic cable, being towed behind a vessel, as is the case during marine seismic exploration of earth formations submerged beneath a body of water. It should be understood, however, that the apparatus A may be used with other types of towed cables in addition to seismic cables.

Figure 3:
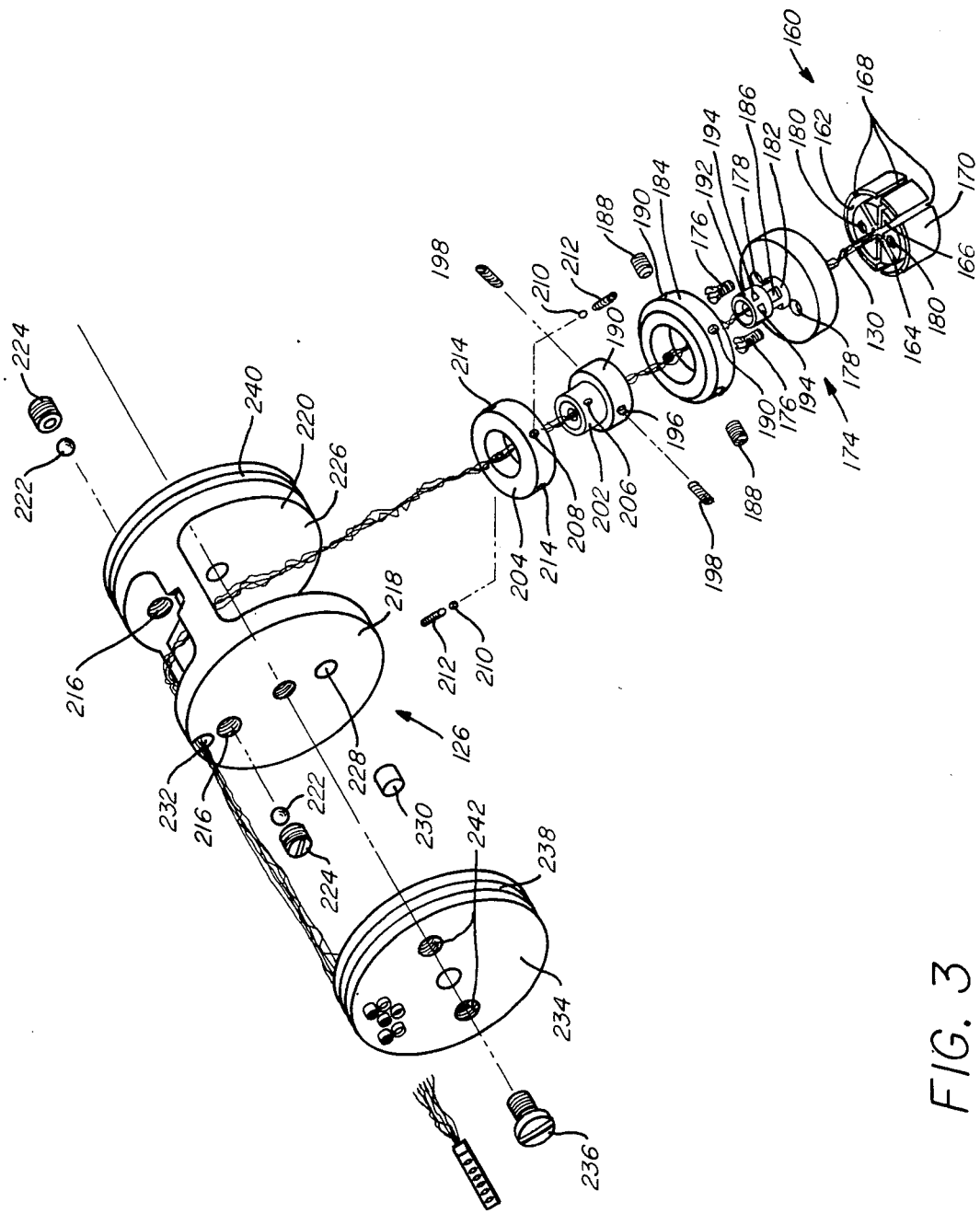
FIG. 3 is an exploded isometric view of a magnetometer of the apparatus of FIG. 2.

The apparatus A includes a flux-gate magnetometer M (FIGS. 1-3) which senses a magnetic vector indicative of horizontal components of the earth's magnetic field in the vicinity of the cable, forming an electrical signal in response to the sensed components. The electric signals from the magnetometer M are received in a converter circuit C of an electrical control circuit E (FIG. 1) of the apparatus A. The converter circuit C converts the signals received from the magnetometer M into digital signals indicative of the earth's magnetic vector and furnishes these signals through a processor circuit P to a transmitter circuit T which transmits the digital signals to the vessel. The processor circuit P controls the operation of the other circuits of the control circuit E and operates in response to a series of instructions to control the operation of the circuit E. The instructions for the processor P are stored in a memory circuit Y, in the preferred embodiment a programmed read only memory.

Figure 1:
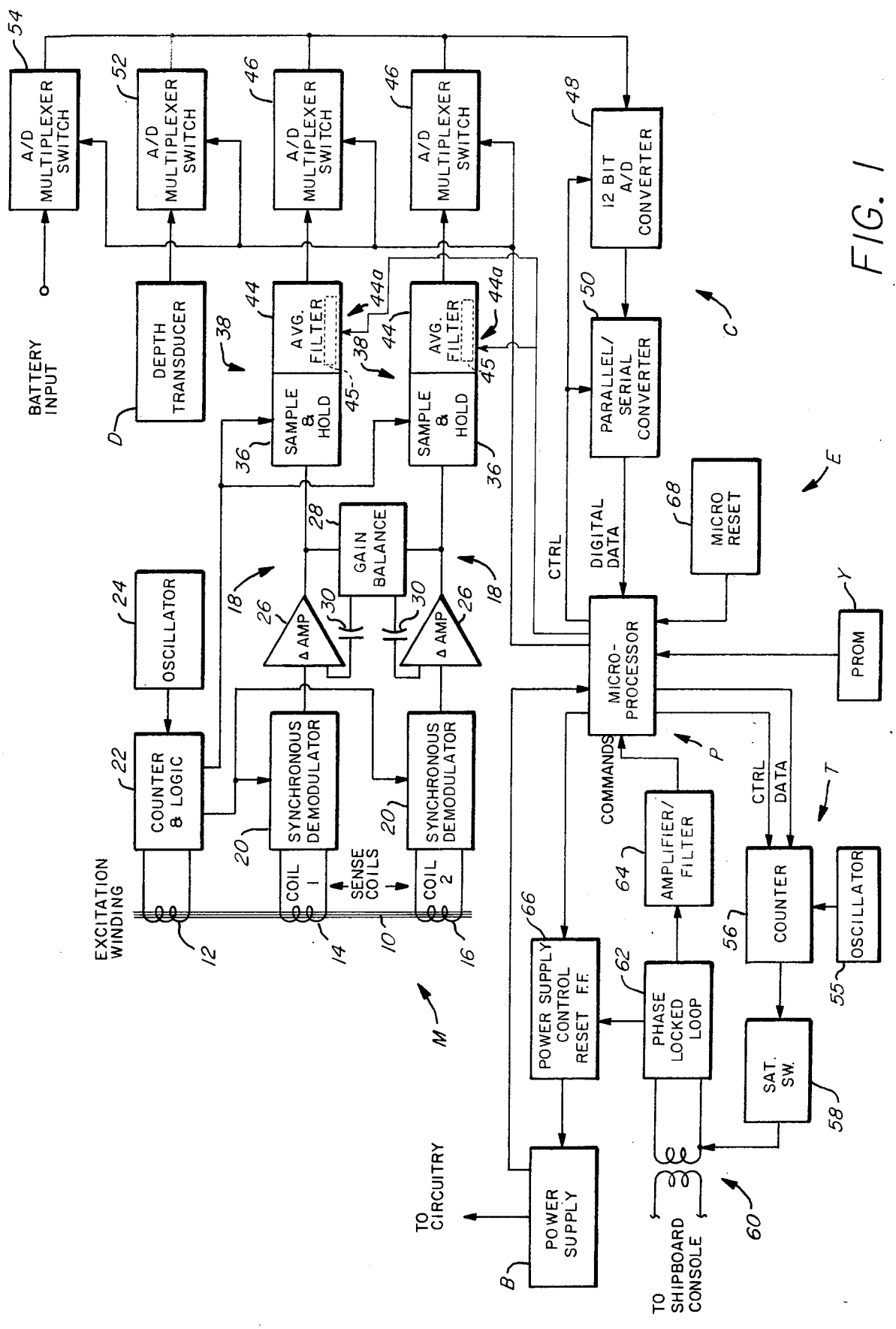
FIG. 1 is a schematic electrical circuit diagram of an apparatus according to the present invention.

Considering the apparatus A more in detail, a generally toroidal mass or body 10 (FIG. 4) of ferromagnetic material serves as a saturable ferromagnetic core for an excitation winding 12, a first sensor coil 14 and a second sensor coil 16. The toroidal core 10 is shown schematically in the circuit E (FIG. 1). The sensor coils 14 and 16 are located in quadrature, or at right angles, to each other (FIG. 4) on the saturable core 10 and accordingly provide readings of the two horizontal components of the earth's magnetic field in the vicinity of the apparatus A. The sensor coil 14 is electrically connected to an analog processing circuit 18. Similarly, the sensor coil 16 is electrically connected to an analog processing circuit of like structure and function to the processor circuit 18. Accordingly, like reference numerals are used for processing circuits 18 and components thereof for each of the coils 14 and 16.

Figure 7:
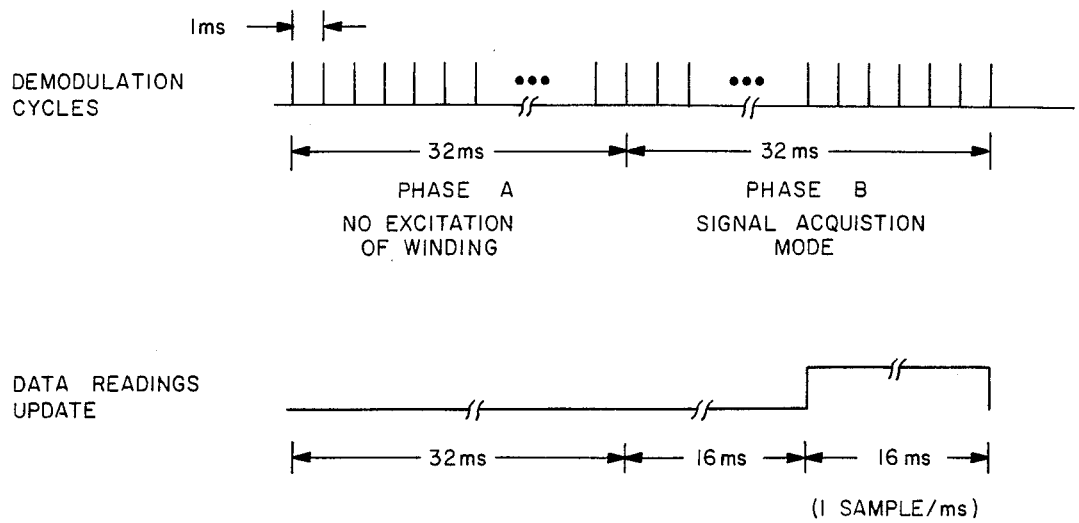
FIGS. 7 and 8 are timing diagrams for the operation of apparatus according to the present invention.

The sensor coils 14 and 16 are each periodically sampled by synchronous demodulators 20 at a suitable rate, such as once each millisecond in demodulation cycles (FIG. 7) under control of a counter and logic circuit 22 (FIG. 1) driven by a oscillator 24. The counter and logic circuit 22 additionally causes the excitation winding 12 to be alternately disabled and enabled during alternate sequences, Phase A and Phase B (FIG. 7) of a predetermined number of, such as thirty-two demodulation cycles.

During each of the demodulation cycles in Phase A and Phase B, the readings taken in the coils 14 and 16 are transferred by the synchronous demodulators 20 to differential amplifiers 26 at a positive input terminal. The differential amplifiers 26 in each of the processing circuits 18 are electrically connected to a gain balancing circuit 28 so that each channel operates at a common gain level. Storage capacitors 30, which perform a voltage offset function, are electrically connected between the gain balance circuit and negative input terminals of the differential amplifiers 26.

During each demodulation cycle of Phase A amplifiers 26 receive background signals, in the absence of excitation of the winding 10, which are furnished to storage capacitors 30. In this manner, storage capacitors 30 accumulate and store an error voltage, representative of an erroneous offset voltage which could be introduced into the data readings during measurement cycles, such as by means of charge injection, bias current offset, transistor leakage and amplifier voltage offset. This error voltage so accumulated in the capacitors 30 during Phase A is stored. During Phase B, when data readings are obtained with the excitation winding 10 activated, the error offset voltage accumulated in the capacitors 30 during Phase A is in effect subtracted by the differential amplifiers 26 from the data readings, thereby removing erroneous offset voltage signals from data readings during Phase B.

Figure 8:
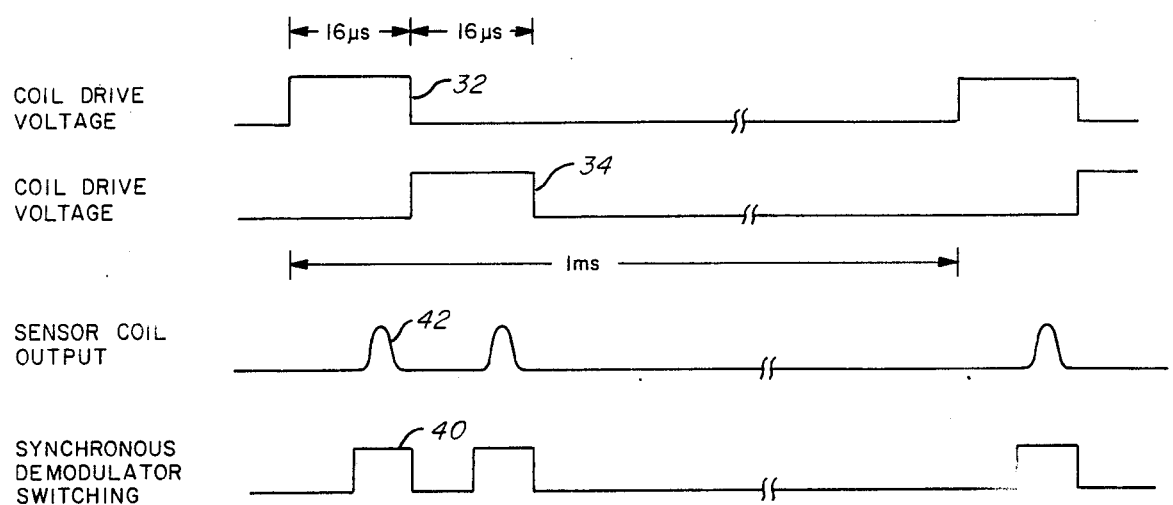

During Phase B of each of the demodulation cycles, the excitation winding 12 is activated by the counter and logic circuit 22 forming pulses 32 and 34 (FIG. 8) of a suitable duration, such as 16 microseconds, occurring in sequence once each demodulation cycle. The pulses 32 and 34 pass through the coil 12 in opposite directions, so that the core 12 is driven to saturation to opposite polarities once during each demodulation cycle.

During a Data Reading Update cycle, comprising the last half of Phase B (FIG. 7) sample and hold sections 36 of a signal averaging circuit 38 are activated by the counter and logic control circuit 22 so that a set number, such as sixteen, data sample pulses are passed through the synchronous demodulator 20. As has been set forth, these data pulses are compensated by means of the gain balance circuit 28 and capacitors 30 to provide offset correction for erroneous offset voltages. During the Update Cycle, the synchronous demodulators 20 are driven by switching wave form 40 (FIG. 8) to pass data, as exemplified by a data pulse wave form 42, through the differential amplifiers 26 to the sample and hold section 36.

The sample and hold section 36 samples each of the data pulse reading waveforms 42 presented thereto during the Update Cycle and presents the reading so obtained to an exponential averaging filter section 44 of the signal averaging circuit 38. The exponential averaging filters 44 form an average reading of the data pulses presented thereto during an update cycle. Thus transient effects due to cable acceleration or deceleration, twisting or the like on instantaneous readings, as were taken in the prior art, are avoided. In this manner, the averaging filters 44 form analog signals representing a time averaged value, rather than an instantaneous one, of the component of the earth's magnetic vectors sensed by the respective coils in the magnetometer M. The averaging filters 44 preferably also have several selectable time constants available under control of the processor P, as indicated by input terminals 44a, so that a user may select an integration time constant of from one to four seconds depending upon wind, wave and weather conditions in the area of the survey. A suitable circuit for such a selectable time constant integrator 45 would take the form of plural resistance-capacitance networks, each selectively activated by a transistor or switch when addressed by the processor P.

An analog-to-digital multiplexer switch 46 is electrically connected to each averaging filter 44 and on receipt of a command from the processor P transfers the analog signal from the averaging filter 44 to an analog-to-digital converter circuit 48 of the converter circuit C. The converter circuit C also includes a parallel/serial converter circuit 50 which converts the digital data received from the analog-to-converter circuit 48 into a serial data stream indicative of the digital value of the readings obtained in the sensor coils 14 and 16 when requested by the processor P.

A depth transducer D of conventional structure in the apparatus A (FIGS. 1 and 2) is also electrically connected through an analog-to-digital multiplex switch 52 to the converter circuit C so that on command from the vessel depth readings from the transducer D may be obtained, converted into digital format, and furnished from the processor P through the transmitter circuit T to the vessel. Additionally, a battery or power supply B of the circuit E connected through an analog-to-digital multiplexer switch 54 to the converter circuit C so that inquiries from the vessel may be made as to power supply levels, obtained and furnished by the processor P.

The transmitter circuit T functions as a frequency shift keyed (FSK) modulator, including an oscillator 55 whose output frequency is controlled by a counter 56 under control of the processor P in accordance with whether the individual digital data bits of the data words representative of the vector sensed by the coils 14 and 16, or the depth readings from the transducer D or power levels in battery B are "1" or "0". The frequency shift keyed signals formed in the transmitter T are furnished by a saturable switch 58 to a transmit/receive coil 60. Signals from the coil 60 are coupled via a conductor in the cable, by any suitable fashion, such as in the manner of U.S. Pat. No. 4,290,124 owned by the assignee of the present invention, to the vessel. At the vessel, the data readings are processed in a data processing unit or computer to obtain, based on the earth's magnetic vector readings, an indication of relative position of apparatus A, and therefore the cable connected therewith, with respect to the vessel. The computation results may be suitably displayed on a display console or recorded as needs require.

The transmitter/receiver coil 60 and a phase locked loop 62 function to receive data request signals or commands from the vessel via the cable such as in the manner of U.S. Pat. No. 4,290,124 or in other suitable fashion. The data pulses sensed in the coil 60 are demodulated via the phase locked loop 62 and transferred through an amplifier/filter circuit 64, when activated, to the processor P. Typically, a message sent down the cable to apparatus A according to the present invention along the length of the cable is composed of a preamble, or alert, code; an address code, indicating whether a particular one, or all of the apparatus A along the cable are being addressed; and a number of command bits or words specifying the data requested from the units or apparatus addressed.

Figure 6:
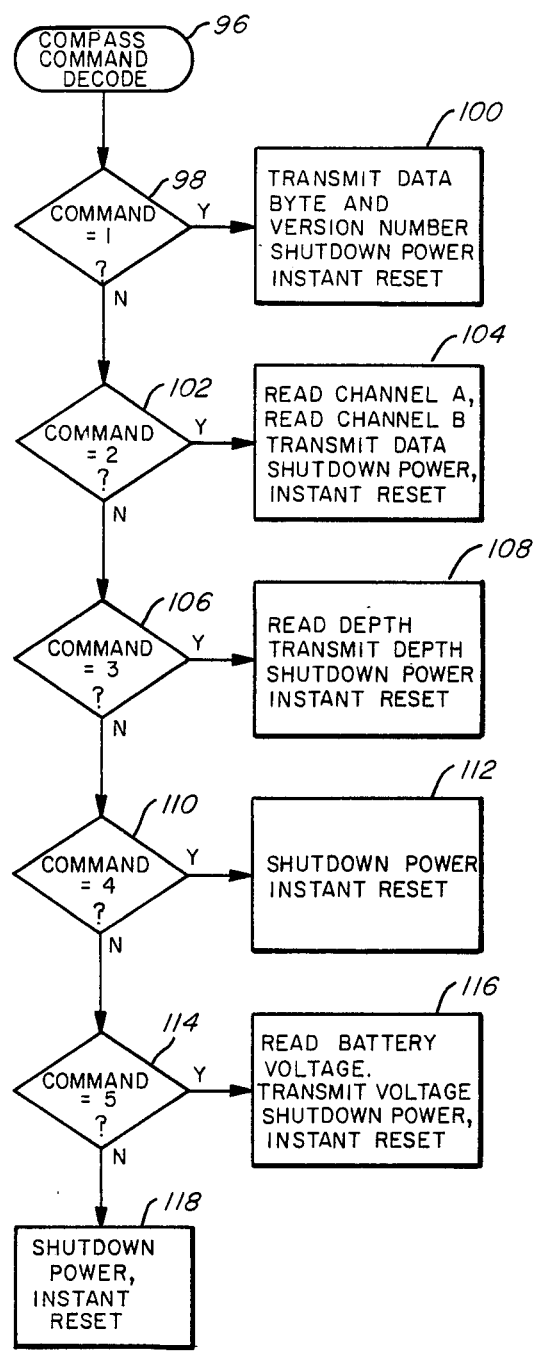
FIGS. 5 and 6 are schematic diagrams of operating cycles of apparatus according to the present invention.
Figure 5:
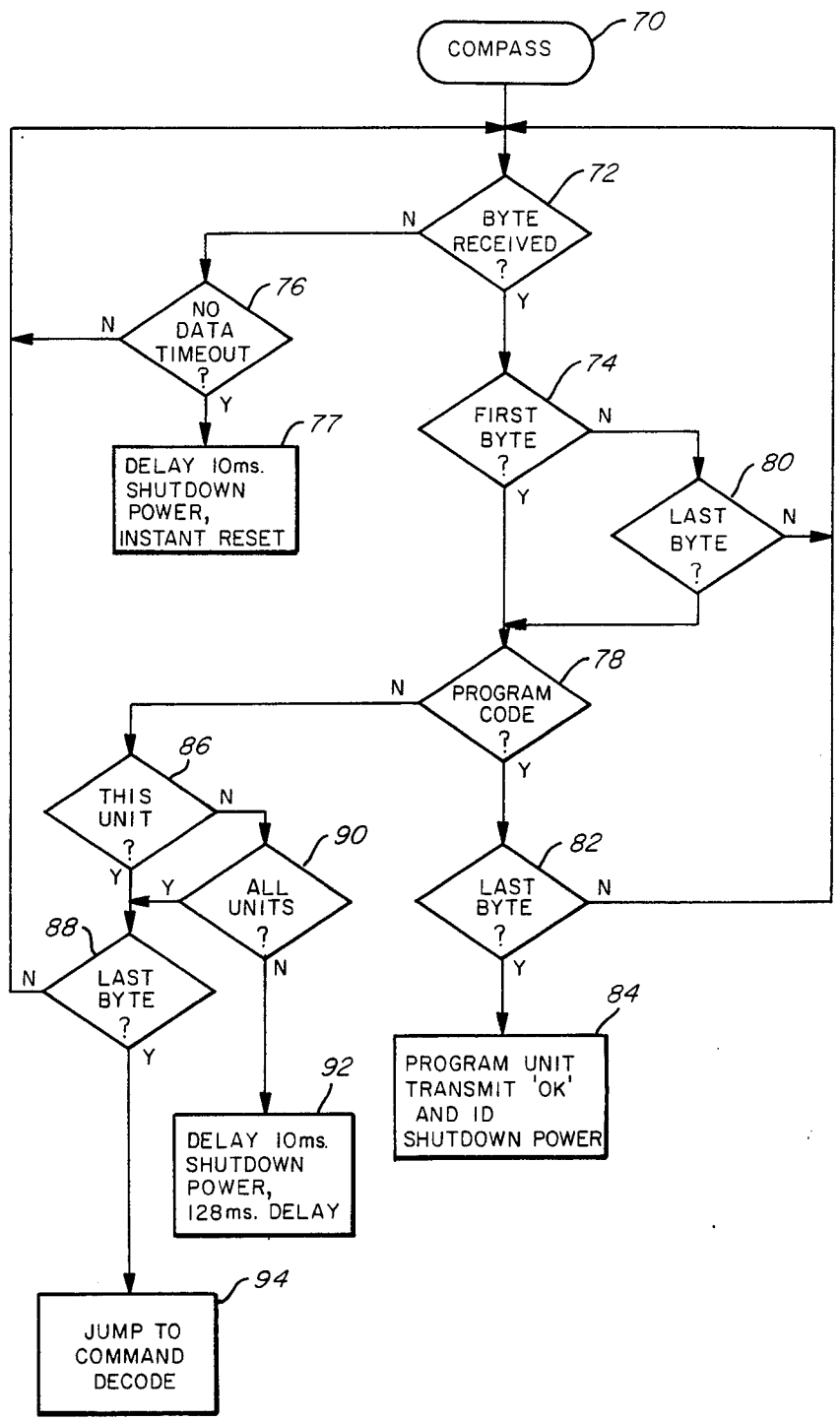

Operating power for the circuit E is provided by the power supply B, when activated. A power supply control circuit 66 is connected to the phase locked loop 62 and is activated by the first pulses of the alert or preamble code received by the phase locked loop 62. At this time, a register or flip-flop in the power supply control circuit 66 changes state, activating the power supply B. The electronic circuit E then receives operating electrical power. The microprocessor P is also reset at this time by a reset circuit 68 to an initial or start step 70 of its control program (FIGS. 5 and 6). Amplifier/filter circuit 64 is also operative at this time, passing the address code of the incoming message to the microprocessor P. The processor P examines the address code to determine if the message is directed to the apparatus A associated therewith during its operating program, as will be discussed. If the address is proper, the processor P continues to operate, receiving the command codes and responding to their content.

In the event that microprocessor P recognizes that it is not being sought or queried, due to the address code, it sends a signal to a time delay portion of the power supply control circuit 66, which holds the register portion of the circuit 66 disabled for the time duration of the incoming message. In this manner, remaining portions of command words addressed to other apparatus on the cable do not reactivate the power supply control circuit 66 from a unit or apparatus whose information is not sought. At the time of furnishing the signal to the time delay portion of control circuit 66, the processor P also deactivates itself and the remaining portions of the circuit E other than the time delay in power supply control 66. In this manner, electrical circuit E does not receive, and therefore does not consume, electrical power unless a data command or request has been received, other than for the brief interval established by the alert and address codes of an incoming command signal.

The operating program for the processor P (FIGS. 5 and 6) sets forth the operating sequence of instructions contained in the memory M in functional format and in sufficient detail to enable a computer programmer of ordinary skill in the art to write a program of appropriately worded instructions to control the operation of the apparatus A. After each resetting by the reset switch 68, the processor P begins at an initial or start step 70 (FIG. 5) of an operating cycle. Control is then transferred to a decision step 72 during which the processor P determines whether a valid data byte has been received. If the result of decision step 72 is positive, control is transferred to a decision instruction 74. In the event processor P during decision step 72 determines that a data byte has not been received, control is transferred to a decision step 76, which is provided for the processor P to protect itself against noise impulses. If processor P responds affirmatively during decision step 76, the power supply B is deactivated during step 77. After a short delay of ten milliseconds or so to protect against factors such as ringing in the lines, power is shutdown and the processor P reset to step 70.

During decision step 74, in the event that a data byte is indicated as being received, processor P determines whether or not the data byte is the first of such bytes. If this is the case, control is transferred to a decision step 78 to determine whether the first data byte is in the proper program code.

If decision step 74 determines that the data byte received was not the first byte, control is transferred to a decision step 80 for processor P to determine whether or not the data byte received was the last byte. If the data bite received was not the last bite, decision step 80 causes processor P to return to step 72. In the event that the processor P during step 80 determines that the last byte was received, control is transferred to program code decision step 78.

In the event that processor P under control of decision step 78 determines that the data code is in the proper format, control is transferred to a decision step 82 which again determines whether or not the last byte of the proper code has been received. In the event this is the case, the processor P cases the transmitter circuit T to transmit an affirmative reply, indicating to the vessel that the apparatus A is operable and responsive to and capable of functioning in response to command signals, as indicated by performance of program step 84. In this manner, an operational check of each apparatus A along the cable may be performed to verify its operability and responsiveness to commands from the vessel. After transmitting this signal, power supply B is disabled by processor P during step 84.

In the event that the result of decision step 82 is negative, control of the processor P is again transferred to decision instruction 72 for a further iteration or cycle. In the event that processor P during decision 78 determines that a program code has not been properly received, control is transferred to a decision instruction 86 to verify whether the apparatus A along among several apparatus along the cable, has been addressed. If this is the case, control is transferred to a decision step 88. If it is not the case, control is transferred to a decision step 90 to verify whether or not all apparatus or units along the cable have been addressed by the vessel to reply. In the event that all such units have been addressed, the processor P during process step 90 transfers control to the decision instruction 88. In the event all units have not been addressed, decision step 90 transfers control to a step 92 which, after a ten millisecond safety delay of the type in step 77, deactivates power to the circuit E and causes the time delay portion of power supply control circuit 66 to be held inactivate. In the event that either step 86 or 90 causes the processor P to form an affirmative indication, decision step 88 verifies that the last byte of a properly coded data word has been received. In the event that this is not the case, decision instruction 88 transfers control to decision instruction 72. In the event that the last byte has been indicated to be properly received by processor P during step 88, control is transferred to a step 94, causing the processor P to transfer to an initial step 96 (FIG. 6) of a command decode subroutine.

In the command decode subroutine, control is transferred from the initial step 96 to a decision step 98. Decision step 98 causes processor P to check the incoming command code to determine whether command code 1 has been received. In the event this is the case, control is transferred to an instruction 100, causing the apparatus A to transmit an identifying code number via the transmitter circuit T to the vessel indicating the version number of the programmed list of instructions in memory M controlling processor P, after which power supply B is deactivated, and the processor P reset to step 70.

In the event that command code 1 is not detected during decision step 98, control is transmitted to a decision step 102, which causes processor P to examine the incoming data command to determine whether or not command code 2 is present. In the event that command code 2 is detected to be present by the processor P, step 104 causes data readings to be taken from the sensor coils 14 and 16 and converted into digital format in the converter circuit C and transmitted in order over the cable to the vessel under control of processor P. After the data messages from the coils 14 and 16 have been transmitted, the processor P deactivates the power supply B and resets processor P to step 70 as concluding steps of performance of step 104.

In the event that the processor P does not detect the presence of command code 2 during decision step 102, control is transferred to a decision instruction 106 to determine whether or not command code 3, or a depth reading request, has been made from the vessel. If command code 3 is present, readings are made from depth transducer D and transmitted to the vessel under control of processor P during step 108, after which power supply B is deactivated and the processor preset to step 70.

In the event code command 3 is not detected present instruction 110 to determine whether or not command 4 is present in the code. At the present time, the apparatus A has no particular need for command 4 and this capacity of the processor P is reserved for future usage. Thus, in the event a command code 4 is detected, the processor P during process step 112 disables the power supply B. In the event that command code 4 is not detected as present, control is transferred from step 110 to a decision step 114 which examines the command word to determine whether or not command code 5 is present. In the event command 5 is detected, control is transferred to a step 116 which causes the processor P to obtain a reading of the voltage output of the supply B and transmit the readings obtained to a vessel, thereafter deactivating the power supply B and resetting processor P to step 70. In the event that command 5 is not detected, control is transferred to a step 118 which causes the processor P to deactivate the power supply B.

Concerning now the mechanical structure of the apparatus A (FIGS. 2 and 3) the housing H includes a cylindrical tube or housing member 120 mounted between a leading end or nose member 122 and a tail member 124. The magnetometer M is mounted in a saddle or support structure 126 which is adapted to be inserted into an opening 128 formed in a forward end of the tail piece 124. The magnetometer M is electrically connected by conductors 130 to electronic circuit E which is mounted on printed circuit boards, such as indicated at 132, within a cylindrical protective cover tube 134. The electronic circuit E is electrically connected via conductors 136 to the power supply or battery B. The electrical circuit E is further electrically connected by conductors 138 to the transmit/receive coil 60 mounted in a support shank 142. Suitable O-ring seals are provided between main body housing 120 and the nose member 122 and tail member 124 in grooves 140 to protect the electrical components of the apparatus A from contact with water.

The housing H is adapted to be mounted with a front support shank 142 and a rear support shank 144 which are adapted to be connected to mounting collars on the cable, in the manner disclosed for example in U.S. Pat. No. 4,290,124. The apparatus A of the present invention are thus physically removable from the cable without requiring disassembly as with prior cable compass units. Further, the number of apparatus and their location may also be modified without disassembling the cable.

Openings 146 are formed in the shank 142 so that bolts may pass into a threaded socket 148 in the nose member 122 and a threaded socket 150, through an opening 152 formed in a forward portion of the tubular cover 120, in the nose member 122. In a like manner, openings 154 are formed in the rear shank 144 so that bolts may pass through corresponding openings 156 formed in a rear portion of the cover 120 into threaded sockets 158 in the tail member 124.

Figure 4:
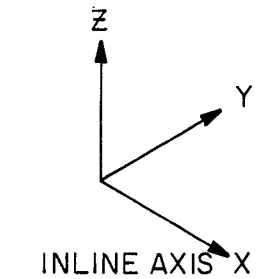
FIG. 4 is a schematic isometric view of coil windings in the magnetometer of FIG. 3.
Figure 4:
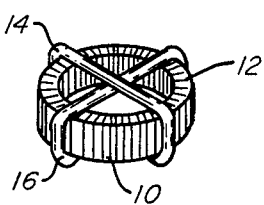

The saturable toroidal magnetic core 10 (FIG. 4) of the magnetometer M is mounted within a non-metallic housing 160 (FIG. 3) in an upwardly extending annular pocket 162. The excitation winding 12 is wrapped about the core 10 (FIG. 4) so that it also fits within the annular pocket 162. The housing 160 further has sensor coil grooves 164 and 166 formed extending diagonally thereacross at right angles to each other. The sensor coils 14 and 16 are wound onto the housing 160 and correspondingly the core 10 therin in the groove 164 and 166. In this manner, coils 14 and 16 are in close proximity with the core 10 (FIG. 4). Slots 168 are formed in the housing 160 for passage of the group of conductors 130 connecting the windings 12, 14 and 16 to the circuit E outwardly through a wall 170 adjacent pocket 162. The conductors 130 pass through similarly formed slots in the bottom of the housing 160 and upwardly therefrom through a central opening to a corresponding opening formed in a support cap 174.

The housing 160 is mechanically interconnected with the cap 174 by means of support screws 176 which extend through openings 178 in the cap member 174 to corresponding openings 180 in the housing 160. An upwardly extending cylindrical alignment rod 182 is formed on the support cap 174 for passage through a horizontal alignment ring 184. The horizontal alignment ring 184 is an annular ring which is adapted to be concentrically mounted with the alignment rod 182 of the cap 172. However, the relative concentric alignment of the ring 184 with respect to the rod 182 may be adjusted to insure that the housing 160, and consequently the core 10, are installed at a horizontally flat reference plane position in the saddle 126. A number of alignment flats 186 are formed on the support rod 182 and are adapted to be contacted by set screws 188 inserted through suitable openings 190 about the periphery of the alignment ring 184. The screws 188 serve as adjustment screws, permitting the relative concentric position of the alignment ring 184 to be ajusted relative to the cap 174 to bring housing 10 (FIG. 4) into the horizontal reference position. In this manner, only the horizontal components of the earth's magnetic field are sensed by the magnetometer M.

It is also desirable to align the housing 160 and the core 10 to align the core with respect to the cylindrical axis of the sleeve 120. For this purpose, an azimuth adjustment ring 190 is adapted to be mounted over an upper portion 192 of the rod 182. Grooves 194 are formed in the rod 182 and are adapted to be aligned with openings 196 in the azimuth adjustment ring 190. Set screws 198 passing through openings 196 formed in ring 190 thus function as azimuth adjustment screws. Azimuth adjustment is made by means of adjusting the position of the azimuth adjustment screws 198 in the grooves 194 until compensation is achieved for azimuthal alignment with respect to the sleeve 120.

The alignment ring 190 includes an upper support collar 202 which is adapted to be suspended within a suspension ring 204. Spherical openings or sockets 206 are formed on the collar 202 and are positioned to be aligned with openings 208 in the suspension ring 204. Support bearings 210 and set screws 212 are inserted into the openings 208 so that the bearings 210 engage the sockets 206. In this manner, the magnetometer M is gimballed for relative fore and aft movement in the stirrup 126 with respect to the longitudinal axis of the cable.

The suspension ring 204 further has spherical sockets or openings 214 formed on an outer surface thereof. Ports or passages 216 are formed in front and rear plates 218 and 220, respectively, of the stirrup 126 so that ball bearings 222 may be brought into contact with the openings 214 on the suspension ring 204 and held in contact therewith by means of set screws 224. In this manner, the magnetometer M is provided with freedom of movement laterally, or from side to side, with respect to the longitudinal axis of the seismic cable.

A central opening or pocket 226 in the stirrup 126, within which the magnetometer M is suspended, may be filled, if desired, with a suitable motion damping fluid to further minimize, in addition to the averaging performed by filters 44 electronically, the effect of motion transients on the magnetic readings obtained in the magnetometer M. However, this is an optional feature since it has been found that the averaging effect performed by the electronic circuit E on data readings is such that the damping effect of fluid in pocket 226 is not needed.

An opening 228 in the front plate member 218 is closed by a pin 230 which is provided for the purposes of aligning the plate member 218 with a front cover plate 234. An opening 232 is provided in the plate member 218 for passage of the conductors 130. The front cover plate 234 is adapted to be mounted with the plate 218 by means of seal screw 236. Annular O-ring grooves 238 and 240 are formed in the plates 234 and 220 for receipt of suitable seals for fluid sealing purposes. Threaded sockets 242 are formed in the plate 234 to permit the insertion of disassembly screws for disassembly purposes.

In the operation of the present invention, a suitable number of apparatus A according to the invention are mounted at desired locations along the length of the cable whose position is desired to be monitored. As has been set forth, the apparatus A are physically removable from the cable without requiring disassembly of cable sections, and may be easily located at any number of desired locations, based on survey and cable location requirements. As the cable is towed or streamed behind the vessel, the apparatus A along its length may be selectively paged to provide readings of the earth's magnetic vector sensed by the magnetometer M as well as readings of the depth of the cable sensed by the depth transducer D. In addition, as has been set forth above, the total number of apparatus A along the length of the cable may be paged and commanded in common, should the need arise. The readings obtained in the apparatus A are transmitted in response to commands over the cable to a processing unit on the towing vessel so that measurement of the earth's magnetic vector may be used to calculate the relative position and depth of the cable portion along which the apparatus A is located with respect to the vessel, as well as the depth of the cable in the vicinity of the apparatus A.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A cable location apparatus for indicating the location of a long marine seismic cable being towed behind a vessel, comprising:
    (a) means for sensing a magnetic vector indicative of the earth's magnetic field in the vicinity of the cable, said sensing means including:
        (1) saturable ferromagnetic core;
        (2) excitation winding means for driving said core into saturation;
        (3) first and second sensor coil means located in guadrature relation to each other on said core for sensing first and second components, respectively, of the earth's magnetic vector in the vicinity of the cable;
        (4) said first and second sensor coil means each generating analog electrical signals in response to the sensed magnetic vector components;
    (b) an analog processing circuit coupled to said first and second sensor coil means to receive said analog signals and for generating averaged analog signals, said analog processing circuit including operator controlled means to vary the time during which said analog signals are averaged;
    (c) converter circuit means for converting said averaged analog electrical signals into digital signals indicative of the components of the earth's magnetic vector in the vicinity of the cable;
    (d) means for transmitting said digital signals to said vessel and for receiving command instructions from said vessel; and
    (e) a stored program processor means operatively coupled to said converter circuit means and said transmitter means, said processor means operating in response to a series of instructions for controlling the operations of said converter circuit means and said transmitter means, said processor means including memory means for storing said series of instructions and providing said instructions, decoding means for decoding said instructions to generate commands, and addressing means for addressing said memory means in response to said commands.

2. The apparatus of claim 1 and further comprising a plurality of said cable location apparatus respectively contained in housings supported from said cable at spaced locations therealong.

3. The apparatus of claim 2 wherein each said analog processing circuit further includes:
   (a) a synchronous demodulator coupled to one of said coils and responsive to said analog electrical signals for generating demodulated signals;
   (b) a differential amplifier circuit having a positive input coupled to said synchronous demodulator means and responsive to said demodulated signals for generating amplified demodulated signals;
   (c) sample and hold circuit means coupled to said differential amplifier circuit and responsive to said amplified demodulated signals for receiving and temporarily storing said amplified demodulated signals;
   (d) integrating circuit means coupled to said sample and hold circuit means for receiving said amplified demodulated signals and for generating an averaged demodulated signal, said integrating circuit means having a variable predetermined time constant; and
   (e) multiplexed switch means coupled to said integrating circuit means and responsive to said averaged demodulated signal and to said processor means for generating said averaged analog signal.

4. The apparatus of claim 3 wherein each said analog processing circuit further includes: gain balancing and offset voltage error correction circuit means coupled to said differential amplifier circuit means for balancing the gain of each said analog processing circuit and for removing erroneous offset voltage signals from said analog electrical signals.

5. The apparatus of claim 4 wherein each said integrating circuit means further includes adjusting circuit means coupled to said processor and to said integrating circuit means and responsive to commands from said processor for varying said predetermined time constant of said integrating circuit means within a predetermined range.

6. The apparatus according to claim 2 wherein each cable location apparatus further includes:
   (a) a power supply for providing operating electrical power to said processing circuit means; and
   (b) control means for inhibiting operation of said power supply in the absence of receipt of said command instructions, thereby to reduce power consumption in said apparatus.

* * * * *